US012195127B2

(12) United States Patent
Hatano et al.

(10) Patent No.: US 12,195,127 B2
(45) Date of Patent: Jan. 14, 2025

(54) MOTORCYCLE SEAT RAIL STRUCTURE (71) Applicant: SUZUKI MOTOR CORPORATION, Hamamatsu (JP)

(72) Inventors: Daisuke Hatano, Hamamatsu (JP); Kyohei Ikoma, Hamamatsu (JP); Kenta Suzuki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 705 days.

(21) Appl. No.: 17/500,056

(22) Filed: Oct. 13, 2021

(65) Prior Publication Data

US 2022/0119060 A1 Apr. 21, 2022

(30) Foreign Application Priority Data

Oct. 19, 2020 (JP) ................................. 2020-175344

(51) Int. Cl.
*B62J 1/08* (2006.01)
*B62J 15/00* (2006.01)

(52) U.S. Cl.
CPC ........ *B62J 1/08* (2013.01); *B62J 15/00* (2013.01)

(58) Field of Classification Search
CPC .. B62K 19/30; B62K 19/36; B62J 1/08; B62J 15/00; B62J 15/02
USPC .......................... 280/288.1, 288.4; 297/195.1
See application file for complete search history.

(56) References Cited

U.S. PATENT DOCUMENTS

| | | | |
|---|---|---|---|
| 9,902,458 B2 | 2/2018 | Matsushima | |
| 2004/0124024 A1* | 7/2004 | Kurayoshi | B62K 11/04 180/219 |
| 2008/0277980 A1* | 11/2008 | Koda | B62K 19/12 297/215.16 |
| 2016/0200387 A1* | 7/2016 | Matsushima | B62K 19/16 180/219 |
| 2016/0288851 A1* | 10/2016 | Tada | B62J 1/12 |
| 2018/0339739 A1* | 11/2018 | Kondo | B62J 25/06 |
| 2019/0300086 A1* | 10/2019 | Enami | B62J 1/08 |
| 2019/0300087 A1* | 10/2019 | Suzuki | B62K 11/02 |

FOREIGN PATENT DOCUMENTS

JP 2019180554 A * 10/2019
WO 2015/033425 A1 3/2015

OTHER PUBLICATIONS

JP-2019180554-A translation (Year: 2019).*

* cited by examiner

*Primary Examiner* — Christopher B Wehrly
(74) *Attorney, Agent, or Firm* — TROUTMAN PEPPER HAMILTON SANDERS LLP (57) ABSTRACT

A seat rail structure installed on a vehicle body of a motorcycle. In such a seat rail structure, each of two lateral members and a first coupling member configured to allow a seat to be placed thereon has a laminated structure made of a fiber reinforced resin, each lateral member includes a vertical wall and an upper flange, the first coupling member includes two upper surface contact portions in contact with the upper flanges of the two lateral members, respectively, and two side surface contact portion extending downward from outer edges of the two upper surface contact portions, respectively, each upper surface contact portion is fastened to the upper flange being in contact with the upper surface contact portion, and each side surface contact portion is fastened to the vertical wall being in contact with the side surface contact portion.

4 Claims, 5 Drawing Sheets

MOTORCYCLE SEAT RAIL STRUCTURE

CROSS REFERENCE TO RELATED APPLICATION

The present application claims priority of Japanese Patent Application No. 2020-175344 filed Oct. 19, 2020. The entire contents of which are hereby incorporated by reference.

TECHNICAL FIELD

The present invention relates to a motorcycle seat rail structure including a seat rail installed on a vehicle body of a motorcycle.

BACKGROUND

A seat rail installed on a motorcycle may support a seat, a fuel tank, and the like. Such a seat rail is required to have increased strength in order to support the seat, the fuel tank, and the like, and is also required to have enhanced vibration damping effect from the viewpoint of improvement of ride comfort. In order to satisfy such requirements, various seat rail structures, that is, various motorcycle seat rail structures have been proposed.

An example of such a motorcycle seat rail structure is a structure in which a rear frame (seat rail) is formed of a fiber reinforced resin, the rear frame includes left and right lateral walls, an upper cross member that is formed separately from the left and right lateral walls and is configured to couple upper edge protrusions of the left and right lateral walls, and a lower cross member that is formed separately from the left and right lateral walls and is configured to couple lower edge protrusions of the left and right lateral walls, the upper edge protrusions of the lateral walls are coupled to end parts in a left-right direction of the upper cross member being in contact with the upper edge protrusions by fastening means inserted into through holes formed therein, respectively, and the lower edge protrusions of the lateral walls are also coupled to end parts in a left-right direction of the lower cross member being in contact with the lower edge protrusions by fastening means inserted into through holes formed therein (for example, see WO 2015/033425 A1).

SUMMARY

Here, the seat rail may adopt a laminated structure in which a plurality of layers made of a fiber reinforced resin are laminated. In the above-described example of the motorcycle seat rail structure, when such a laminated structure is adopted for the seat rail, it is difficult to sufficiently increase an axial force for fastening the upper edge protrusions of the lateral walls and the end parts in the left-right direction of the upper cross member being in contact with the upper edge protrusions with the fastening means and an axial force for fastening the lower edge protrusions of the lateral walls and the end parts in the left-right direction of the lower cross member being in contact with the lower edge protrusions with the fastening means, considering creep deformation of a resin in the fiber reinforced resin.

When it is difficult to sufficiently increase the axial force of the fastening means on the seat rail, the fastening means may be displaced in the through hole due to a load applied to the seat rail from the outside. In particular, when a load is applied to a rear part of the seat rail from an occupant, luggage, and the like due to traveling of a motorcycle on a rough road, the seat rail is deformed in the left-right direction due to such a load, and as a result, for example, a peripheral edge of the through hole in the upper cross member described above may come into contact with the fastening means. Due to such contact, local stress concentration may be caused on the seat rail. Such local stress concentration may cause "delamination" of the seat rail, whereby laminated adjacent layers which were joined together separate from each other, and as a result, strength of the seat rail may decrease.

In view of these circumstances, the motorcycle seat rail structure is preferably configured such that the strength of the seat rail can be sufficiently ensured and the vibration damping effect of the seat rail can be efficiently improved.

In order to solve the problems, a motorcycle seat rail structure according to an aspect is a motorcycle seat rail structure including a seat rail installed on a vehicle body of a motorcycle, wherein: the seat rail includes two lateral members spaced apart from each other in a width direction of the vehicle body and a first coupling member configured to couple the two lateral members to each other and to allow a seat to be placed thereon; each of the two lateral members and the first coupling member is configured to have a laminated structure in which a plurality of layers made of a fiber reinforced resin are laminated; each of the lateral members includes a vertical wall located at a lateral side in the width direction of the vehicle body and an upper flange protruding toward a center in the width direction of the vehicle body from an upper edge of the vertical wall; the first coupling member includes two upper surface contact portions that are in contact with the upper flanges of the two lateral members, respectively; each of the upper surface contact portions includes an outer edge facing outward in the width direction of the vehicle body; the first coupling member includes two side surface contact portions extending downward from the outer edges of the two upper surface contact portions, respectively; the two side surface contact portions are in contact with the vertical walls of the two lateral members, respectively; upper fastening portions are provided to fasten together the upper surface contact portions and the upper flanges, which are in contact with the upper surface contact portions; and first side surface fastening portions are provided to fasten together the side surface contact portions and the vertical walls, which are in contact with the side surface contact portions.

In a motorcycle seat rail structure according to an aspect, strength of a seat rail can be sufficiently ensured, and a vibration damping effect of the seat rail can be efficiently improved.

DETAILED DESCRIPTION

A motorcycle seat rail structure according to an embodiment will be described together with a motorcycle in which the seat rail structure is applied. Here, the motorcycle to which the motorcycle seat rail structure (hereinafter, simply referred to as a "seat rail structure" as necessary) is applied includes typically one front wheel and one rear wheel. However, the motorcycle may include two front wheels and one rear wheel.

Figure 1:
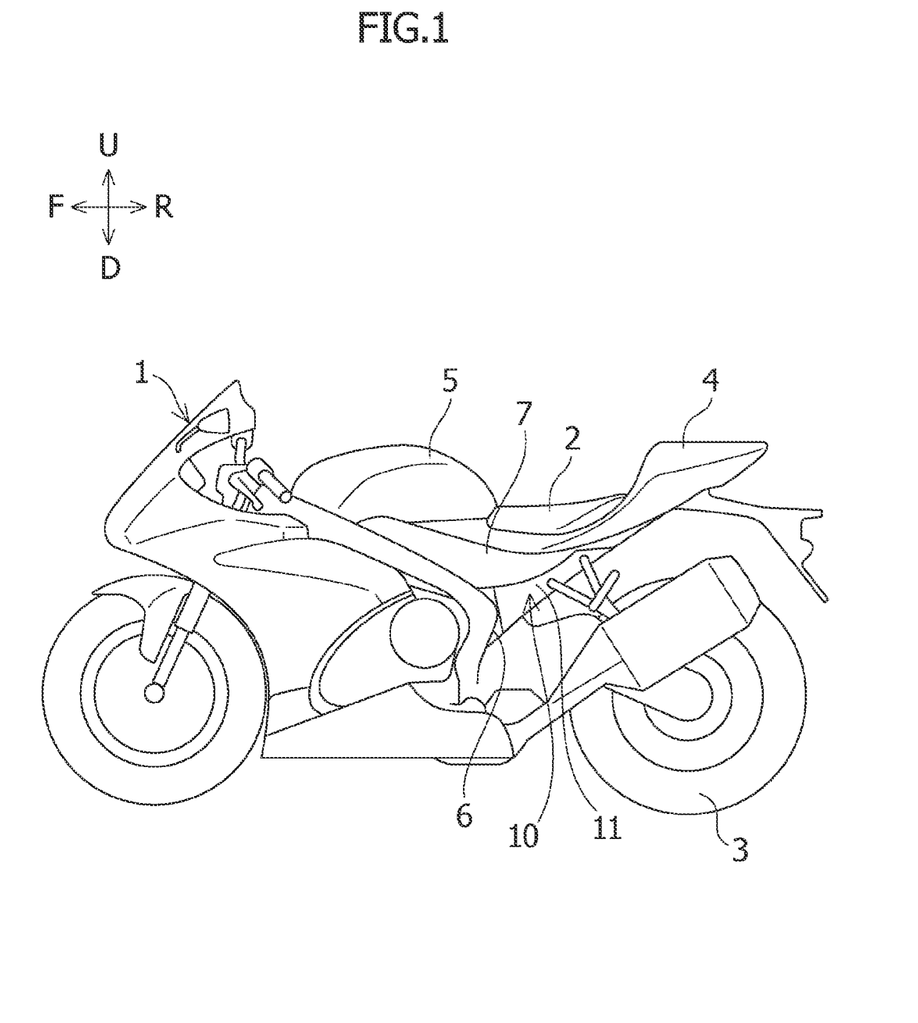
FIG. 1 is a side view schematically showing a motorcycle including a seat rail structure according to an embodiment.
Figure 2:
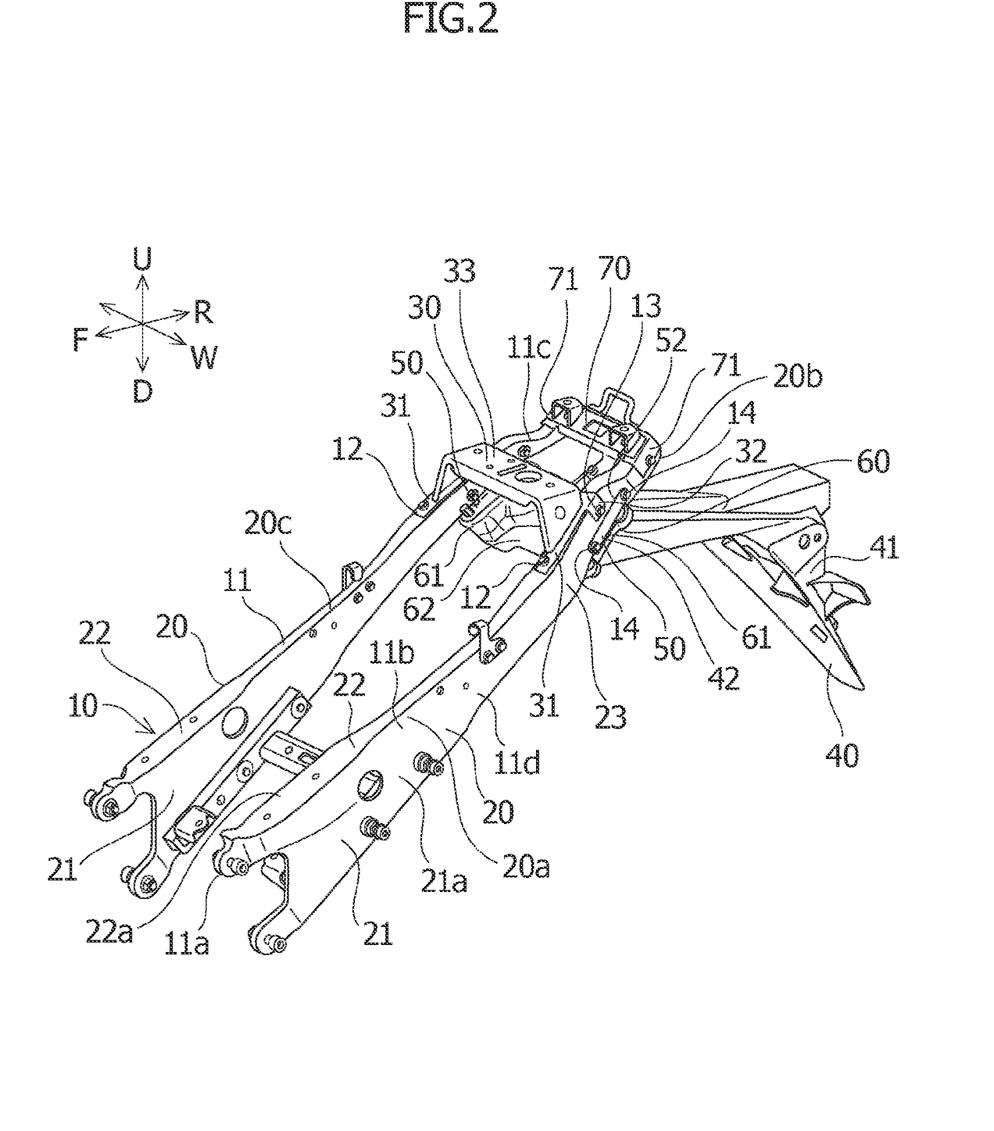
FIG. 2 is a perspective view schematically showing the seat rail structure according to the embodiment.
Figure 3:
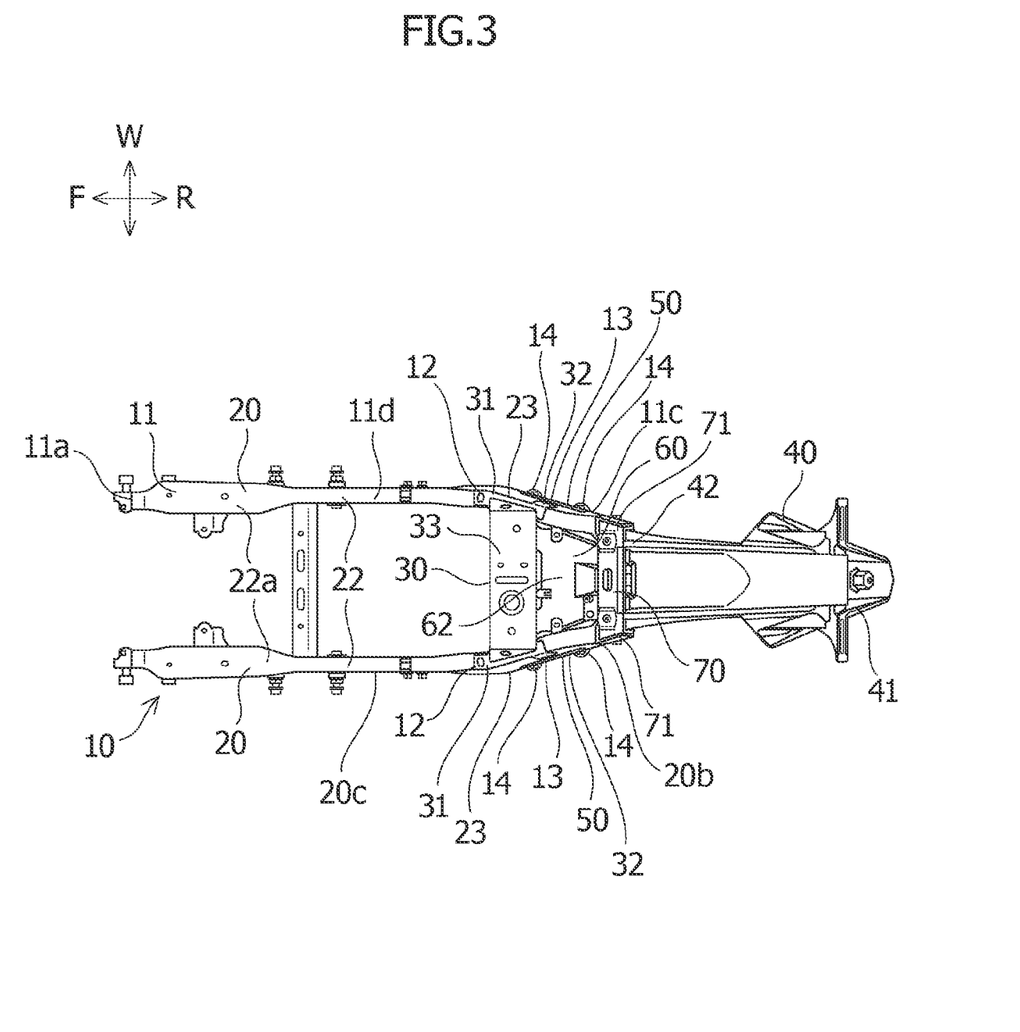
FIG. 3 is a plan view schematically showing the seat rail structure according to the embodiment.
Figure 4:
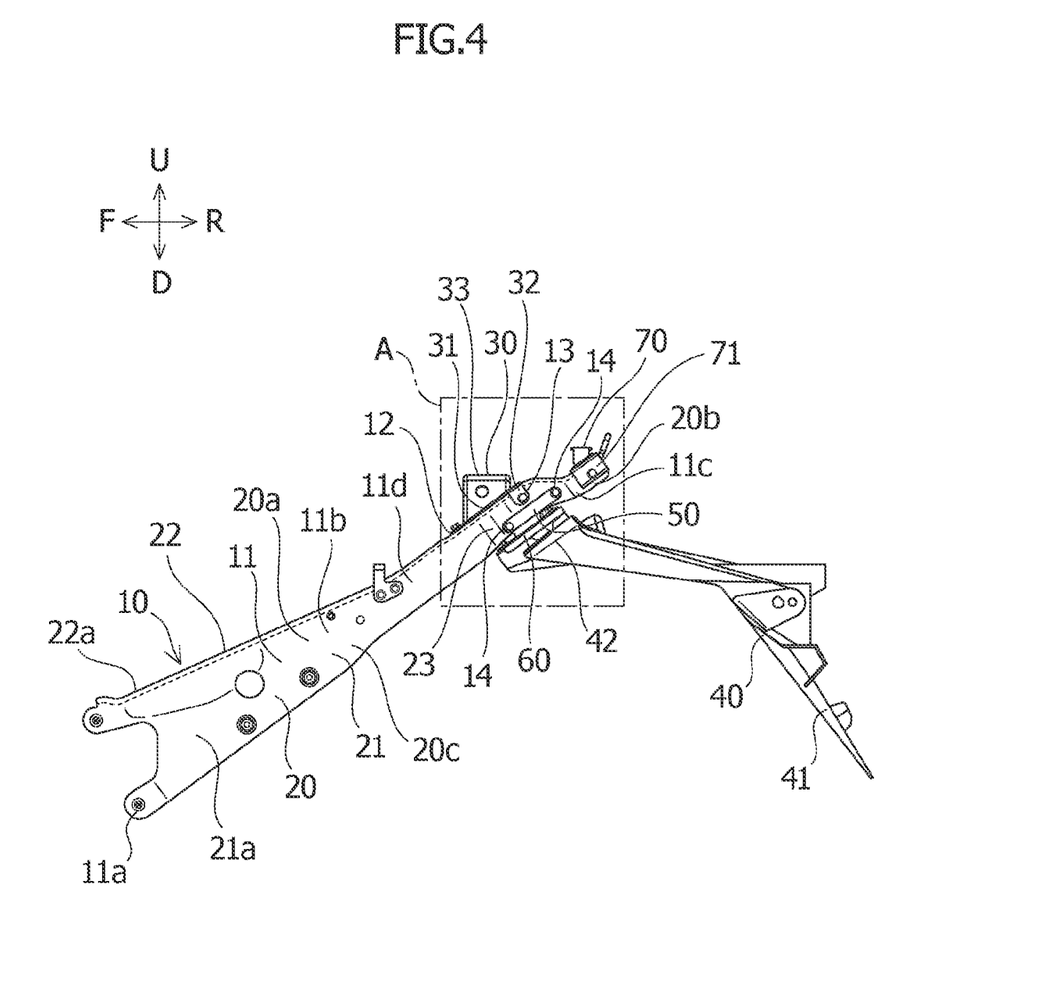
FIG. 4 is a side view schematically showing the seat rail structure according to the embodiment.

In FIGS. 1 to 5 of the present embodiment, a front of a vehicle body 1 of the motorcycle (hereinafter, simply referred to as "front" as necessary) is indicated by a one-headed arrow F, and a rear of the vehicle body 1 (hereinafter, simply referred to as "rear" as necessary) is indicated by a one-headed arrow R. Therefore, a front-rear direction of the vehicle body 1 (hereinafter, simply referred to as a "front-rear direction" as necessary) is indicated by the one-headed arrow F and the one-headed arrow R. In FIGS. 2 and 3, a width direction of the vehicle body 1 (hereinafter, simply referred to as a "width direction" as necessary) is indicated by a two-headed arrow W. In FIGS. 1, 2, 4, and 5, an upper side of the vehicle body 1 (hereinafter, simply referred to as an "upper side" as necessary) is indicated by a one-headed arrow U, and a lower side of the vehicle body 1 (hereinafter, simply referred to as a "lower side" as necessary) is indicated by a one-headed arrow D. An up-down direction of the vehicle body 1 (hereinafter, simply referred to as an "up-down direction" as necessary) is indicated by the one-headed arrow U and the one-headed arrow D.

An outline of a seat rail structure 10 and the motorcycle according to the present embodiment will be described with reference to FIGS. 1 to 5. In other words, the seat rail structure 10 and the motorcycle are generally configured as follows. As shown in FIG. 1, the seat rail structure 10 includes a seat rail 11 that is installed on the vehicle body 1 of the motorcycle.

As shown in FIGS. 2 and 3, the seat rail 11 includes two lateral members 20 spaced apart from each other in the width direction. The lateral members 20 are located at lateral sides in the width direction of the vehicle body 1, respectively. As shown in FIGS. 2 to 5, the seat rail 11 includes a first coupling member 30 that couples the two lateral members 20 together. The first coupling member 30 is configured to allow a seat 2 (shown in FIG. 1) to be placed thereon. Each of the two lateral members 20 and the first coupling member 30 are configured to have a laminated structure in which a plurality of layers made of a fiber reinforced resin are laminated.

Each of the lateral members 20 includes a vertical wall 21 located at a lateral side in the width direction of the vehicle body 1. Each of the lateral members 20 includes an upper flange 22 protruding toward a center in the width direction of the vehicle body 1 from an upper edge of the vertical wall 21 of the lateral member 20.

The first coupling member 30 includes two upper surface contact portions 31 being in contact with the upper flanges 22 of the two lateral members 20. Each of the upper surface contact portions 31 includes an outer edge 31a facing outward in the width direction of the vehicle body 1. The first coupling member 30 includes two side surface contact portions 32 extending downward from the outer edges 31a of the two upper surface contact portions 31, respectively. The two side surface contact portions 32 are in contact with the vertical walls 21 of the two lateral members 20, respectively.

The seat rail structure 10 includes an upper surface fastening portion 12 which fastens together the upper surface contact portions 31 and the upper flanges 22 being in contact with the upper surface contact portions 31. The seat rail structure 10 further includes first side surface fastening portions 13 which fasten together the side surface contact portions 32 and the vertical walls 21 being in contact with the side surface contact portions 32.

Figure 5:
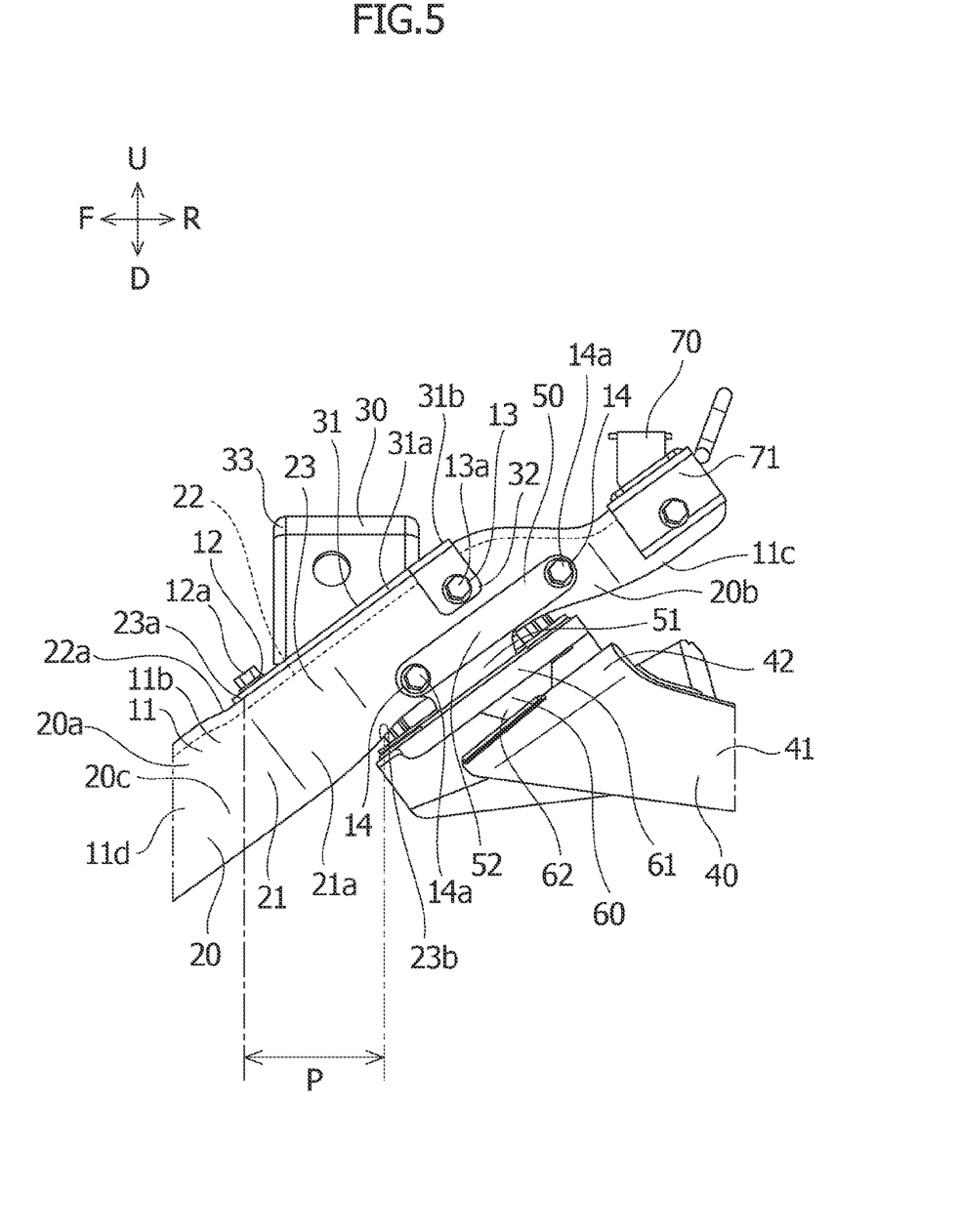
FIG. 5 is an enlarged view of a part A in FIG. 4.

Furthermore, the seat rail structure 10 and the motorcycle according to the present embodiment can be generally configured as follows. As shown in FIGS. 2 to 5, each of the lateral members 20 includes a curved region 23 that is curved so as to be located closer to a center in the width direction of the vehicle body 1 as it extends toward a rear of the vehicle body 1 from a front of the vehicle body 1. As shown in FIG. 5, when the vehicle body 1 is viewed in the width direction, each of the upper surface contact portions 31 is disposed to straddle an area P between a front end 23a and a rear end 23b of the curved region 23 in one of the two lateral members 20 being in contact with the upper surface contact portion 31 in the front-rear direction of the vehicle body 1.

As shown in FIGS. 2 to 5, the two side surface contact portions 32 also extend downward from rear areas 31b of the outer edges 31a in the two upper surface contact portions 31 located closer to the rear of the vehicle body 1.

The seat rail structure 10 includes a rear fender 40 that covers an upper side of a rear wheel 3 (shown in FIG. 1) of the motorcycle. The seat rail structure 10 includes two rear fender brackets 50 being in contact with the two lateral members 20, respectively. The seat rail structure 10 includes a second coupling member 60 that couples the two rear fender brackets 50 together.

The rear fender 40 is attached to the two rear fender brackets 50 through the second coupling member 60. The seat rail structure 10 includes two second side surface fastening portions 14 that fasten one of the rear fender brackets 50 and the lateral member 20 being in contact with the one of the rear fender brackets 50 together, respectively. The seat rail structure 10 includes two second side surface fastening portions 14 located at one side in the width direction thereof and two second side surface fastening portions 14 located at the other side in the width direction thereof. The two second side surface fastening portions 14, which are located at one side or the other side in the width direction of the seat rail 11 are spaced apart from each other in the front-rear direction, and these two second side surface fastening portions 14 are disposed at both sides in the front-rear direction of the first side surface fastening portion 13, respectively, above the first side surface fastening portion 13.

Referring to FIGS. 1 and 2, the motorcycle according to the present embodiment can be configured in detail as follows. As shown in FIG. 1, the vehicle body 1 of the motorcycle includes a luggage rack 4. As shown in FIG. 1, the luggage rack 4 is located behind the seat 2. The luggage rack 4 is adjacent to the seat 2 in the front-rear direction.

Referring to FIGS. 1 and 2, the seat 2 and the luggage rack 4 are supported from below by the seat rail 11. Specifically, a rear in the front-rear direction of the seat 2 is supported from below by the first coupling member 30 of the seat rail 11. The luggage rack 4 is also supported from below by the first coupling member 30 of the seat rail 11. As shown in FIG. 1, the vehicle body 1 includes a fuel tank 5. The fuel tank 5 is located in front of the seat 2. The fuel tank 5 is also adjacent to the seat 2 in the front-rear direction.

The vehicle body 1 includes a main frame 6. The main frame 6 is located in front of the seat rail 11, and is located below the fuel tank 5. The main frame 6 is adjacent to the seat rail 11 in the front-rear direction. Referring to FIGS. 1 and 2, a front end part 11a of the seat rail 11 in the front-rear direction is attached to the main frame 6.

As shown in FIG. 1, the vehicle body 1 includes an outer panel 7. The outer panel 7 is located below the seat 2. The outer panel 7 is also adjacent to the seat 2 in the up-down direction. The outer panel 7 covers an upper part 11b of the seat rail 11 from both outer sides in the width direction. Specifically, the outer panel 7 covers an upper part 20a of each of the lateral member 20 from the outer side in the width direction. However, the vehicle body may be configured so as not to include the outer panel. In this case, the vehicle body may be configured such that the lateral member is exposed to the outside of the vehicle body as an exterior member.

Referring to FIGS. 2 to 5, the seat rail structure 10 according to the present embodiment can be configured in detail as follows. The seat rail 11 of the seat rail structure 10 includes a third coupling member 70 located behind the first coupling member 30.

The third coupling member 70 couples two lateral members 20 to each other. Specifically, the third coupling member 70 couples rear end parts 20b in the front-rear direction of the two lateral members 20 to each other. Both end parts 71 in the width direction of the third coupling member 70 are in contact with the upper flanges 22 of the two lateral members 20, respectively. The both end parts 71 of the third coupling member 70 are also in contact with the vertical walls 21 of the two lateral members 20, respectively. The both end parts 71 of the third coupling member 70 are attached to the rear end parts 20b of the two lateral members 20, respectively.

As shown in FIG. 5, in the seat rail structure 10, the upper surface fastening portion 12, the first side surface fastening portion 13, and the second side surface fastening portion 14 include fastening members 12a, 13a, and 14a and fastened members (not shown), respectively, each of the fastening members including a male screw part and a head part, and the fastened members including female parts into which male screw parts (not shown) of the fastening members 12a, 13a, and 14a are respectively screwed. Furthermore, each of the upper surface fastening portion 12, the first side surface fastening portion 13, and the second side surface fastening portion 14 is configured such that a plurality of fastened portions are fastened between the head parts of the fastening members 12a, 13a, and 14a and the fastened members in a state in which the male screw parts of the fastening members 12a, 13a, and 14a being inserted into through holes (not shown) formed in the plurality of fastened portions are screwed into the female screw parts of the fastened members. For example, the fastening members 12a, 13a, and 14a may be bolts, and the fastened members may be nuts. However, a fastening method of the upper surface fastening portion, the first side surface fastening portion, and the second side surface fastening portion is not limited thereto.

Referring to FIGS. 2 to 5, each of the lateral members 20 can be configured in detail as follows. The two lateral members 20 are configured to be a substantially symmetrical with each other in the width direction. The curved region 23 of the lateral member 20 is located between a rear end part 11c of the seat rail 11 and an intermediate part 11d in the front-rear direction of the seat rail 11. Specifically, the curved region 23 of the lateral member 20 is located between the rear end part 20b of the lateral member 20 and an intermediate part 20c in the vehicle front-rear direction of the lateral member 20.

The vertical wall 21 of each of the lateral members 20 is formed in an elongated shape with a front-rear direction being a longitudinal direction. The vertical wall 21 of each of the lateral members 20 includes an outer surface 21a facing outward in the width direction of the vehicle body 1. Two side surface contact portions 32 of the first coupling member 30 are in contact with the outer surfaces 21a of the two vertical walls 21, respectively. Two rear fender brackets 50 are in contact with the outer surfaces 21a of the two vertical walls 21, respectively. The both end parts 71 of the third coupling member 70 are in contact with the outer surfaces 21a of the two vertical walls 21, respectively.

The upper flange 22 of each of the lateral members 20 is formed in an elongated shape with a front-rear direction being a longitudinal direction. The upper flange 22 of each of the lateral members 20 includes an upper surface 22a facing upward. The two upper surface contact portions 31 of the first coupling member 30 are in contact with the upper surfaces 22a of the two upper flanges 22, respectively. The both end parts 71 of the third coupling member 70 are in contact with the upper surfaces 22a of the two upper flanges 22, respectively.

Referring to FIGS. 2 to 5, the first coupling member 30 can be configured in detail as follows. The first coupling member 30 includes a first coupling member main body 33 that couples the two upper surface contact portions 31 to each other. The first coupling member main body 33 is formed in a substantially U-shape.

Referring to FIGS. 2 to 5, the rear fender 40, the rear fender bracket 50, and the second coupling member 60 can be configured in detail as follows. The rear fender 40 includes a rear fender main body 41 that covers an upper side of the rear wheel 3 of the motorcycle. The rear fender 40 includes a vehicle body-side attachment portion 42 used to attach the rear fender 40 to the seat rail 11. The vehicle body-side attachment portion 42 is located at a front end part in the front-rear direction of the rear fender main body 41. The vehicle body-side attachment portion 42 of the rear fender 40 is disposed to be attached to the rear end part 11c of the seat rail 11 from below together with the two rear fender brackets 50 and the second coupling member 60.

Each of the rear fender brackets 50 includes a coupling-side attachment portion 51 to be attached to the vehicle body-side attachment portion 42 of the rear fender 40 through the second coupling member 60. Specifically, the coupling-side attachment portions 51 of the two rear fender brackets 50 are attached to end parts 61 in the width direction of the second coupling member 60, respectively, and an intermediate part 62 in the width direction of the second coupling member 60 is attached to the vehicle body-side attachment portion 42 of the rear fender 40.

Each rear fender bracket 50 includes a side surface contact portion 52 that rises from the coupling-side attachment portion 51 of the rear fender bracket 50. The side surface contact portions 52 of the two rear fender brackets 50 are in contact with the vertical walls 21 of the two lateral members 20, respectively. Specifically, the side surface contact portions 52 of the two rear fender brackets 50 are in contact with the outer surfaces 21a of the vertical walls 21 of the two lateral members 20, respectively.

Each of the side surface contact portions 52 is disposed to be sandwiched between the vertical wall 21 being in contact therewith and the head parts or the fastened members (not shown) of the fastening members 14a of the two second side surface fastening portions 14 to be fastened to the vertical wall 21. Each of the side surface contact portions 52 is formed in an elongated shape to extend between the two second side surface fastening portions 14 to be fastened to the vertical wall 21 being in contact with such a side surface fastening portion 52.

As described above, the seat rail structure 10 according to the present embodiment is the motorcycle seat rail structure 10 including the seat rail 11 installed on the vehicle body 1 of the motorcycle, wherein: the seat rail 11 includes two lateral members 20 spaced apart from each other in the width direction of the vehicle body 1 and the first coupling member 30 configured to couple the two lateral members 20 to each other and to allow the seat 2 to be placed thereon; each of the two lateral members 20 and the first coupling member 30 is configured to have the laminated structure in which a plurality of layers made of the fiber reinforced resin are laminated; each of the lateral members 20 includes the vertical wall 21 located at the lateral side in the width direction of the vehicle body 1 and the upper flange 22 protruding toward the center in the width direction of the vehicle body 1 from the upper edge of the vertical wall 21; the first coupling member 30 includes the two upper surface contact portions 31 that are in contact with the upper flanges 22 of the two lateral members 20, respectively; each of the upper surface contact portions 31 includes the outer edge 31a facing outward in the width direction of the vehicle body 1; the first coupling member 30 includes the two side surface contact portions 32 extending downward from the outer edges 31a of the two upper surface contact portions 31, respectively; the two side surface contact portions 32 are in contact with vertical walls 21 of the two lateral members 20, respectively; the upper surface fastening portions 12 are provided to fasten together the upper surface contact portions 31 and the upper flanges 22, which are in contact with the upper surface contact portions 31; and the first side surface fastening portions 13 are provided to fasten together the side surface contact portions 32 and the vertical walls 21, which are in contact with the side surface contact portions 32.

In such a seat rail structure 10, the first coupling member 30 is coupled to the two lateral members 20, using the upper surface contact portion 31 that is in contact with and fastened to the upper flange 22 of each of the lateral members 20, and the side surface contact portion 32 that is oriented in a different direction from the upper surface contact portion 31 and that is in contact with and fastened to the vertical wall 21 of each of the lateral members 20. Therefore, even when a load is applied to the rear part of the seat rail 11 by an occupant, luggage, or the like due to traveling on the motorcycle on a rough road or riding of the motorcycle on a step, vibration in a specific vibration mode can be prevented from being amplified in one direction. As a result, such vibration can be prevented from being transmitted to the occupant through the seat 2. In other words, a vibration damping effect can be efficiently improved, and ride comfort of the occupant can be improved.

In addition, by the two side surface contact portions 32 of the first coupling member 30, the seat rail 11 can be prevented from being deformed to open in the width direction of the vehicle body 1, for example, the seat rail 11 can be prevented from being deformed into a substantially trapezoidal shape when viewed from the front in the vehicle body 1. In this case, a shear load applied to the upper surface fastening portion 12 and the first side surface fastening portion 13 can be prevented. As a result, for example, even when the upper surface fastening portion 12 is configured such that the fastening member 12a is inserted into a through hole (not shown), and the contact between the fastening member 12a in the upper surface fastening portion 12 and a peripheral edge (not shown) of the through hole occurs due to the load applied from the seat 2, delamination can be prevented from occurring in and around such a contact part.

In particular, since the first side surface fastening portion 13 can be disposed to be separated downward as much as possible from a corner between the upper flange 22 and the vertical wall 21, the load applied to the seat rail 11 can be shared more with the first side surface fastening portion 13 than with the upper surface fastening portion 12, and as a result, local stress concentration in and around the upper surface fastening portion 12 can be prevented in particular. Accordingly, strength of the seat rail 11 can be efficiently improved.

In the seat rail structure 10 according to the present embodiment, each of the lateral members 20 includes the curved region 23 that is curved so as to be located closer to the center in the width direction of the vehicle body 1 as it extends toward the rear of the vehicle body 1 from the front of the vehicle body 1, and when the vehicle body 1 is viewed in the width direction thereof, each of the upper surface contact portions 31 is disposed to extend over the area P between the front end 23a and the rear end 23b of the curved region 23 in the front-rear direction of the vehicle body 1 in one of the two lateral members 20 being in contact with the upper surface contact portion 31.

In cases in which a battery is disposed in a front part of an internal space of the seat rail 11, it is necessary for the front part of the internal space to be formed wider than a rear part thereof. On the other hand, when the front part of the internal space of the seat rail 11 is formed wider than the rear part, the curved region 23 is formed in the seat rail 11, and the seat rail 11 may be easily bent centering around the curved region 23.

In contrast, in the seat rail structure 10 according to the present embodiment, the upper surface contact portion 31 of the first coupling member 30 to be fastened to each of the lateral members 20 is disposed to cover the area P between the front end 23a and the rear end 23b of the curved region 23 of the lateral member 20 in the front-rear direction of the vehicle body 1. Therefore, the front part of the internal space of the seat rail 11 can be formed wider than the rear part thereof, the curved region 23 of the lateral member 20 and the surroundings thereof can be reinforced by the upper surface contact portion 31 of the first coupling member 30, and as a result, the seat rail 11 can be prevented from being bent centering around the curved region 23. Accordingly, the strength of the seat rail 11 can be efficiently improved.

In the seat rail structure 10 according to the present embodiment, the two side surface contact portions 32 extend downward from the rear areas 31b of the outer edges 31a in the two upper surface contact portions 31 located closer to the rear of the vehicle body 1.

Generally, when the motorcycle is travelling, the rear part of the seat rail is more subjected to the load from the occupant than the front part thereof. Taking this into consideration, in the seat rail structure 10 according to the present embodiment, since the first side surface fastening portion 13, which fastens the side surface contact portion 32 extending downward from the rear area 31b of the outer edge 31a of the upper surface contact portion 31 in the first coupling member 30 and the vertical wall 21 of the lateral member 20, can be disposed to be separated downward as much as possible from the corner between the upper flange 22 and the vertical wall 21, the load applied to the seat rail 11 can be shared more with the first side surface fastening portion 13 than with the upper surface fastening portion 12. As a result, for example, even when the upper surface fastening portion 12 is configured such that the fastening member 12a is inserted into the through hole (not shown), and the contact between the fastening member 12a in the upper surface fastening portion 12 and the peripheral edge (not shown) of the through hole occurs due to the load applied from the seat 2, delamination can be prevented from occurring in and around such a contact part.

The seat rail structure 10 according to the present embodiment includes: the rear fender 40 that covers the upper side of the rear wheel 3 of the motorcycle; the two rear fender brackets 50 being in contact with the two lateral members 20, respectively, and the second coupling member 60 that couples the two rear fender brackets 50, wherein the rear fender 40 is attached to the two rear fender brackets 50 through the second coupling member 60, and the two second side surface fastening portions 14, which fasten the rear fender brackets 50 and the lateral members 20 being in contact with the rear fender brackets 50 together, are spaced apart from each other in the front-rear direction of the vehicle body 1, and are disposed at both sides of the first side surface fastening portion 13 in the front-rear direction of the vehicle body 1, respectively, above the first side surface fastening portion 13.

In such a seat rail structure 10, the load applied to the vertical wall 21 of the lateral member 20 from the first side surface fastening portion 13 can be distributed by the two second side surface fastening portions 14. Therefore, the stress concentration in the lower part of the lateral member 20 can be prevented in particular. Accordingly, the strength of the seat rail 11 can be efficiently improved.

Although the embodiment of the present invention has been described above, the present invention is not limited to the above-described embodiment, and the present invention can be modified and changed based on the technical idea thereof.

The invention claimed is:

1. A motorcycle seat rail structure comprising a seat rail installed on a vehicle body of a motorcycle, wherein:
   the seat rail includes two lateral members spaced apart from each other in a width direction of the vehicle body and a first coupling member configured to couple the two lateral members to each other and to allow a seat to be placed thereon;
   each of the two lateral members and the first coupling member is configured to have a laminated structure in which a plurality of layers made of a fiber reinforced resin are laminated;
   each of the lateral members includes a vertical wall located at a lateral side in the width direction of the vehicle body and an upper flange protruding toward a center in the width direction of the vehicle body from an upper edge of the vertical wall;
   the first coupling member includes two upper surface contact portions that are in contact with the upper flanges of the two lateral members, respectively;
   each of the upper surface contact portions includes an outer edge facing outward in the width direction of the vehicle body;
   the first coupling member includes two side surface contact portions extending downward from the outer edges of the two upper surface contact portions, respectively;
   the two side surface contact portions are in contact with the vertical walls of the two lateral members, respectively;
   an upper fastening portion is provided to fasten each of the upper surface contact portions and the upper flange which is in contact with the each of the upper surface contact portions, together; and
   a first side surface fastening portion is provided to fasten together each of the side surface contact portions and the vertical wall, which is in contact with the each of the side surface contact portions.

2. The motorcycle seat rail structure according to claim 1, wherein:
   each of the lateral members includes a curved region that is curved so as to be located closer to the center in the width direction of the vehicle body as it extends toward a rear of the vehicle body from a front of the vehicle body; and
   when the vehicle body is viewed in the width direction thereof, each of the upper surface contact portions is disposed to extend over an area between a front end and a rear end of the curved region in one of the two lateral members being in contact with the each of the upper surface contact portions in a front-rear direction of the vehicle body.

3. The motorcycle seat rail structure according to claim 1, wherein
   the two side surface contact portions extend downward from rear areas of the outer edges in the two upper surface contact portions located closer to a rear of the vehicle body.

4. The motorcycle seat rail structure according to claim 1, further comprising:
   a rear fender that covers an upper side of a rear wheel of the motorcycle;
   two rear fender brackets being in contact with the two lateral members, respectively; and
   a second coupling member that couples the two rear fender brackets, wherein:
   the rear fender is attached to the two rear fender brackets through the second coupling member; and
   two second side surface fastening portions, which fasten the rear fender brackets and the lateral members being in contact with the rear fender brackets together, are spaced apart from each other in the front-rear direction of the vehicle body, and are disposed at both sides of the first side surface fastening portion in the front-rear direction of the vehicle body, respectively, above the first side surface fastening portion.

* * * * *